March 29, 1960 E. H. LAND ET AL 2,930,301
PHOTOGRAPHIC PRODUCT EMBODYING MEANS FOR EXPOSING
AND PROCESSING PHOTOSENSITIVE MATERIALS
Filed Nov. 28, 1958 6 Sheets-Sheet 5

Edwin H. Land
and
Vaito K. Eloranta
INVENTORS

BY Brown and Mikulka
and
Robert E. Corb

ATTORNEYS

United States Patent Office 2,930,301
Patented Mar. 29, 1960

2,930,301

PHOTOGRAPHIC PRODUCT EMBODYING MEANS FOR EXPOSING AND PROCESSING PHOTOSENSITIVE MATERIALS

Edwin H. Land, Cambridge, and Vaito K. Eloranta, Needham, Mass., assignors to Polaroid Corporation, Cambridge, Mass., a corporation of Delaware Application November 28, 1958, Serial No. 776,932

20 Claims. (Cl. 95—13)

This invention relates to photographic products and apparatus and, more particularly, to cameras for exposing and processing photosensitive materials.

This application is a continuation in part of our copending application, Serial No. 645,526 filed March 12, 1957 and entitled, Photographic Product Embodying Means for Exposing and Processing Photosensitive Materials.

Numerous forms of cameras have been proposed for exposing a photosensitive element and thereafter processing the photosensitive element by superposing it with a second element and distributing a fluid processing reagent between the two elements for producing a visible image, preferably a positive print, on the second element. Cameras of this type include means which function to process the photosensitive elements and, accordingly, are not found in conventional cameras. Heretofore, this type of camera has been constructed so that it may be used repeatedly, being reloaded each time the photographic materials with which it is employed have been expended.

Objects of the invention are: to provide a novel camera adapted to expose and process a photosensitive element having a construction which is simple, inexpensive and permits ready assembly; to provide as a photographic product, a camera of the foregoing type containing a plurality of photographic film units, the camera being so inexpensive as to be expendable following its employment for exposing and processing the film units with which it is provided; to provide a photographic product as described wherein said film units comprise a plurality of photosensitive elements arranged in stacked relation in position for exposure within a first chamber and a plurality of second elements, each including a container of fluid processing reagent, arranged in another stack in a second chamber apart from said photosensitive elements, each of said second elements being adapted to be superposed with an exposed photosensitive element and a fluid processing reagent, carried by said second element, spread from said container in a layer between said elements to effect the processing thereof; and to provide a camera of the foregoing type, which, with the exception of a lens and shutter assembly, is adapted to fabrication entirely from relatively stiff and inexpensive sheet materials, preferably cardboard, having a thickness dimension not exceeding forty-one thousandths of an inch.

Other objects of the invention will in part be obvious and will in part appear hereinafter.

The invention accordingly comprises the product possessing the features, properties and the relation of components, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Generally, the present invention is concerned with the construction of a novel photographic product in the form of a camera containing a plurality of photographic film units and capable of exposing and processing the film units, preferably to produce a plurality of photographic prints. The camera itself functions as a package for the film units in which they are supplied as well as an apparatus for exposing and processing the film units, and its construction is sufficiently simple and inexpensive so that the camera may be discarded when the film units, supplied therein, have been expended. The construction of the camera must therefore be quite simple and inexpensive and, accordingly, the camera casing is of the so-called box type, formed of an inexpensive, stiff sheet material such as cardboard; the shutter, which is both accurate and has a plurality of speed and diaphragm settings, if formed largely of molded plastic material with only a minimum of parts fabricated from sheet metal; and a pressure-applying device for processing the film units formed of two simple sheet metal blanks.

Figure 1:
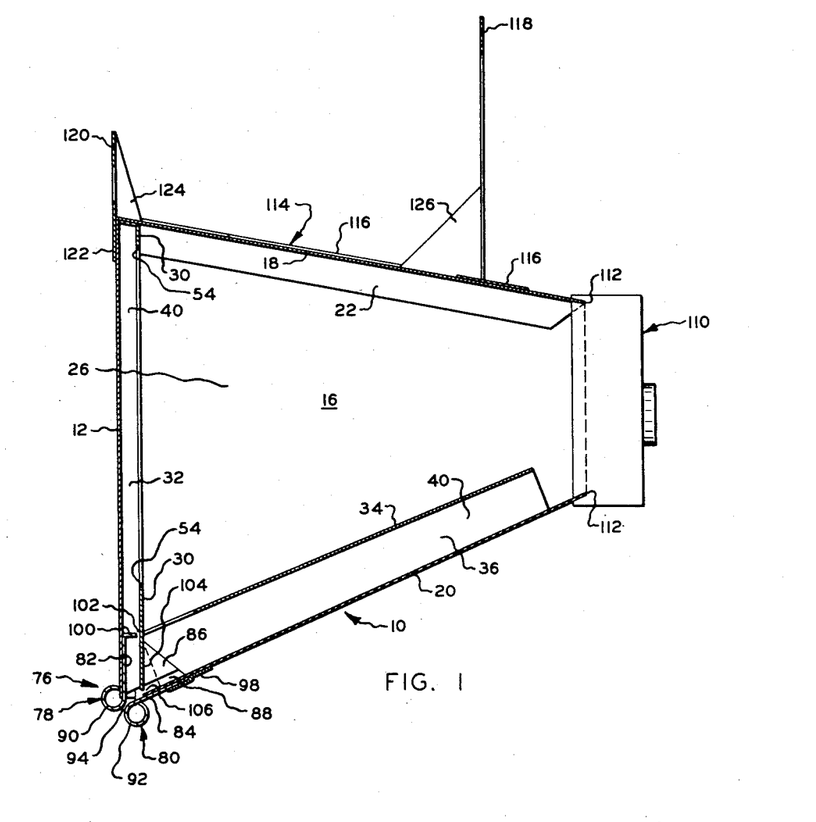
Figure 1 is a somewhat schematic sectional view of a product, in the form of a camera, embodying the invention, the section being taken along a plane generally midway between the sides of the camera.
Figure 2:
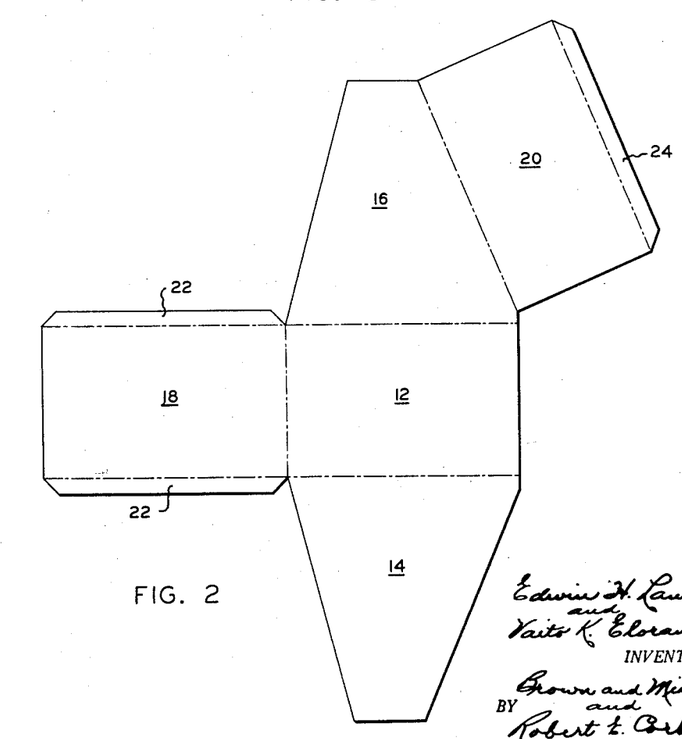
Figs. 2 and 3 are plan views of blanks of sheet material comprising the housing of the camera of Fig. 1.

Reference is now made to the drawings wherein there is shown a photographic product in the form of a box camera embodying the present invention. The camera casing or housing, designated 10, can be formed of a single blank of a relatively stiff sheet material, that is, a material having a thickness dimension not in excess of .040 inch. Suitable materials include, for example, cardboard, sheet metal or plastic material. The blank is folded to provide a rectangular rear wall 12, generally triangular side walls 14 and 16, a rectangular upper wall 18 and lower wall 20. A blank, suitable for this purpose and adapted to be fabricated of a material such as cardboard, may take the form shown, for example, in Fig. 2 of the drawings, and includes a generally rectangular portion comprising rear wall 12, triangular portions providing side walls 14 and 16 extending from the sides of rear wall 12, and a rectangular upper wall 18 extending from the upper side of rear wall 12. A rectangular section comprising lower wall 20 extends from the lower edge of side wall 16. Upper wall 18 is provided with a pair of flaps or flanges 22 at its lateral edges and lower wall 20 is provided with a single flap or flange 24 along its lower edge for securing the blank together to form casing 10. The broken lines in the drawing indicate where the blank is folded to form corners at the intersections of the various walls and flaps so that it may be assembled to form casing 10 having upper and lower walls which converge away from the rear wall and toward the front of the casing. Side walls 14 and 16, upper wall 18 and lower wall 20 combine to provide a tapered exposure chamber, designated 26, open at its forward end. Lower wall 20 is shaped so as to provide an opening 28 at the intersection of lower wall 20 and rear wall 12 through which film units provided in casing 10 may be withdrawn.

Figure 3:
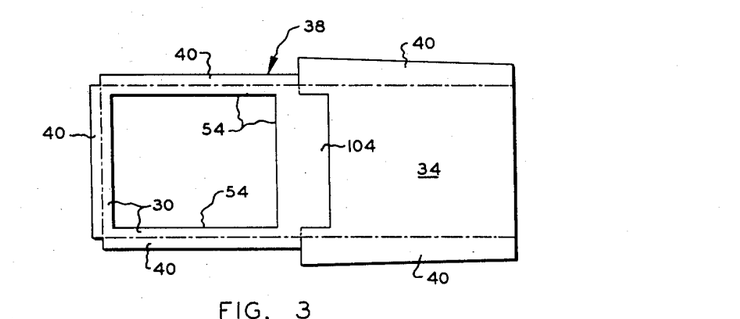

The camera casing includes an inner rear wall 30 which cooperates with rear wall 12 to define a first storage chamber 32 and an inner lower wall 34 which cooperates with lower wall 20 to define a second storage chamber 36. Walls 30 and 34 may comprise a single elongated blank, designated 38, such as is shown in Fig. 3, folded intermediate its ends as indicated by broken lines and provided with edge flaps or flanges 40 at which walls 30 and 34 are mounted and secured within casing 10 to side walls 14 and 16 and upper wall 18.

Figure 4:
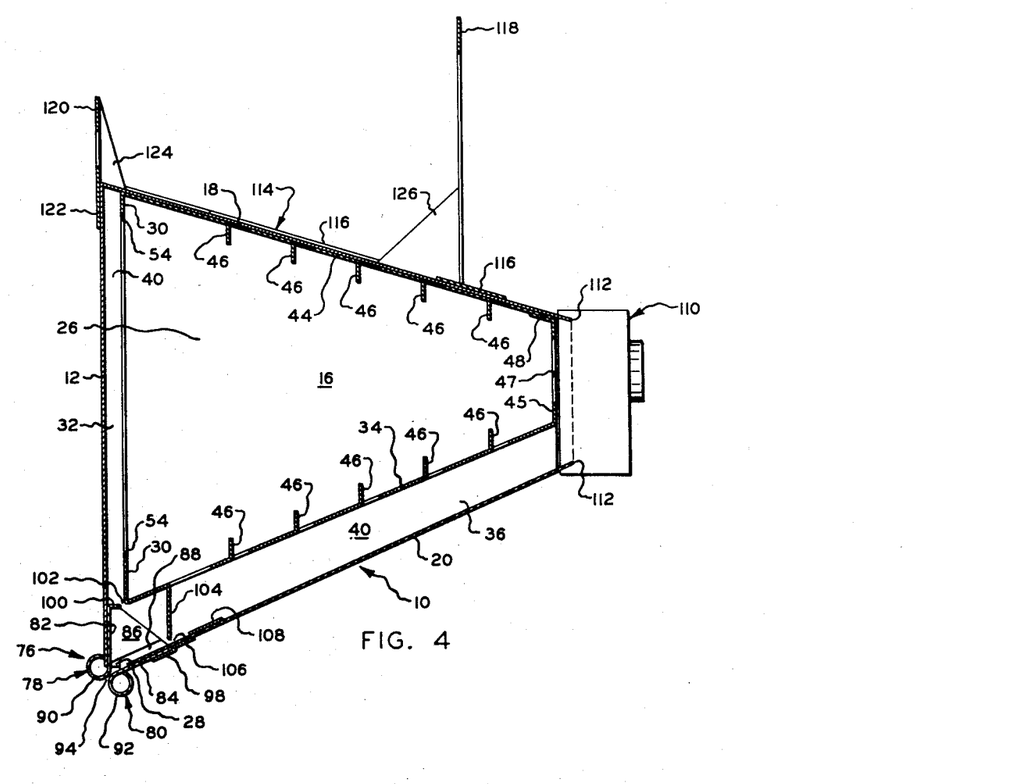
Fig. 4 is a view similar to Fig. 1 of another form of camera embodying the invention.
Figure 5:
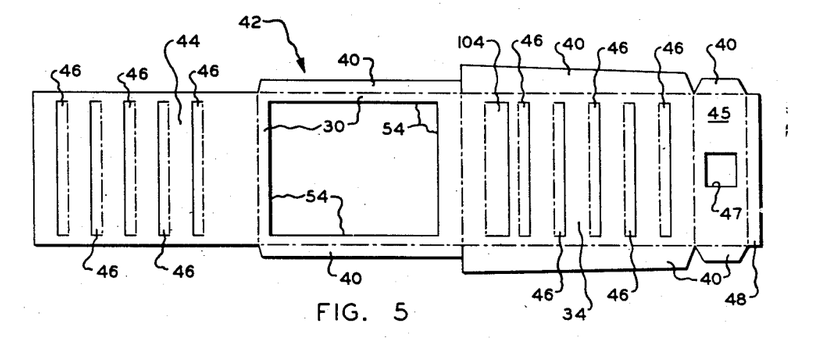
Fig. 5 is a plan view of a blank comprising the housing of the camera of Fig. 4.

In another form of the camera casing shown in Figs. 4 and 5, a blank, designated 42, which is adapted to form the inner, rear and lower walls, is provided with a third rectangular section 44 adapted to be secured against the inner surface of upper wall 18 and a fourth section 45 having an aperture 47 therein adapted to extend across the opening in the forward end of chamber 26. Section 44 of blank 42 and inner lower wall 34 are provided with a series of partially cut-out sections 46 which may be folded inwardly to provide a series of light baffles, also designated 46, which aid in preventing internal light reflections within chamber 26. Fourth section 45 is provided with an extended section or flap 48 adapted to overlap and be secured to the end edge of third section 44 when the housing is assembled. Flanges or flaps 40 are provided along the lateral edges of the sections of blank 42 comprising inner rear wall 30, inner lower wall 34 and third section 44 for securing the walls, formed by the blank, to the side walls of the casing.

Figure 6:
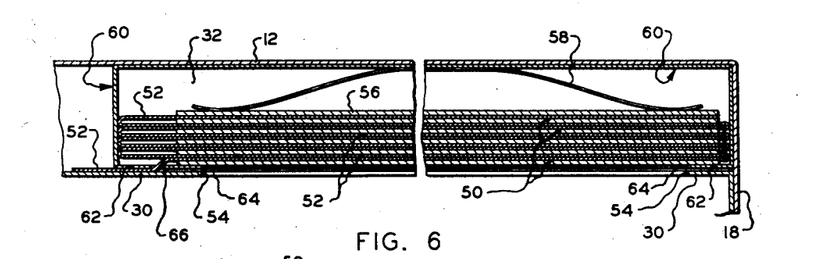
Figs. 6 and 7 are schematic sectional views of portions of the cameras of Figs. 1 and 4 showing the arrangement of photographic materials provided in the camera.
Figure 7:
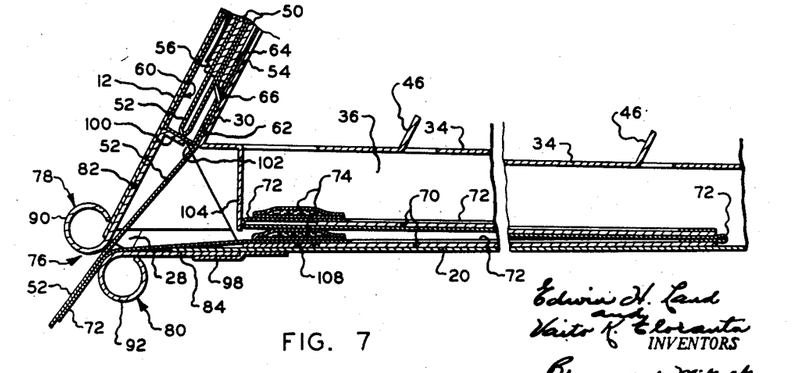

The product of the invention includes, in the form shown in Figs. 6 and 7, a plurality of photosensitive sheets 50 arranged in stacked relation within first storage chamber 32. The photosensitive sheets are mounted on a continuous carrier strip 52 which extends behind each photosensitive sheet 50, to which it is secured, and thence back upon itself and behind the next successive photosensitive sheet in a zigzag pattern whereby the photosensitive sheets may be withdrawn in succession from chamber 32 with the aid of the carrier strip. Inner rear wall 30 is provided with a rectangular aperture 54 through which photosensitive sheets within chamber 32 are exposed. The photosensitive sheets are urged forward against the rear surface of inner rear wall 30 so that the foremost photosensitive sheet is located against the wall across the aperture in position for exposure. As a means for holding the photosensitive sheets in position for exposure against wall 30, there is provided a pressure plate 56 and spring 58 located behind the stack of photosensitive sheets.

The stack of photosensitive sheets, together with the carrier strip and spring and pressure plate, may be provided in chamber 32 or they may be provided in an envelope within the chamber, this envelope, designated 60, serving to facilitate loading of the photosensitive sheets into the chamber during assembly of the camera. In the form shown, envelope 60 includes a forward wall 62 having an aperture 64 corresponding to aperture 54 in rear wall 30. A slit 66 is provided in wall 62 adjacent the end thereof nearest opening 28 in the camera housing through which carrier strip 52 extends and through which the photosensitive sheets and carrier strip may be withdrawn from the envelope. Slit 66 is spaced in from the end of the envelope so that only one photosensitive sheet at a time can be withdrawn therefrom through the slit, since the folds of the carrier strip extend to the end of the envelope. It may be desirable to provide an opaque sheet adapted to function as a dark slide attached to the carrier strip within the envelope and located against forward wall 62 of the envelope across aperture 64 and for initially closing the aperture during assembly of the camera. This opaque sheet may be removed after assembly is complete any time prior to exposure. In another form of the invention, the spring and pressure plate may be provided within chamber 32 but outside of and behind the envelope rather than within the envelope.

The camera of the invention is adapted to effect the processing of exposed photosensitive sheets preferably to produce therefrom a plurality of positive photographic prints. This processing is accomplished during withdrawal of each exposed photosensitive sheet from the camera by superposing said sheet with a second sheet and spreading a fluid processing reagent in a thin layer between the superposed sheets. A plurality of second sheets 70 are provided in stacked relation within second storage chamber 36 mounted on a continuous carrier strip 72. The fluid processing reagent for the photosensitive and second sheets is provided in a plurality of rupturable containers 74, each mounted on carrier strip 72 adjacent the leading end of each second sheet. Each container 74 is formed of a rectangular blank of fluid-impervious sheet material folded longitudinally to form two side walls which are sealed together at their margins to provide a fluid cavity. The longitudinal edge seal is adapted to become unsealed upon the application of compressive pressure to the walls of the container to effect the unidirectional discharge of the container contents. Each container 74 is secured to the carrier strip with this longitudinal edge seal located closely adjacent the leading edge of a second sheet in position to discharge so that the container contents will be discharged between the second sheet and a photosensitive sheet superposed therewith. Carrier strip 72 is secured to that surface of each of the second sheets which is adapted to be superposed with a photosensitive sheet and, accordingly, the carrier strip is provided with a succession of rectangular apertures substantially coextensive with the exposure frame size. Thus, the portions of the carrier strips which are located between the second sheets and the photosensitive sheets superposed therewith not only function to secure the second sheets to the carrier strip but act as a mask to provide a border for the photographic prints formed on the second sheets.

The above-mentioned photographic prints are formed on the second sheets preferably by a process involving a diffusion-transfer of image-forming substances produced as a result of development of the latent images in the photosensitive sheets. In one preferred form, each of the photosensitive sheets comprises a silver halide emulsion, each of the second sheets comprises a print-receiving layer and the fluid processing reagent includes a silver halide developer and a silver halide solvent. This fluid reagent, when spread in a thin layer between an exposed photosensitive sheet and a second sheet superposed therewith, causes the transfer and development of unexposed silver halide, producing a positive transfer print on the second sheet. For further examples of processes and products of the foregoing type and adapted to be employed in the camera of the invention, reference may be had ot Patent No. 2,543,181, issued February 27, 1951 in the name of Edwin H. Land.

As previously indicated, the fluid processing reagent is spread between a pair of photosensitive and second sheets to form a sandwich in which processing occurs during withdrawal of the sandwich from the camera through opening 28. Accordingly, the photosensitive and second sheets are formed of a light-opaque material or are provided with a light-opaque coating or backing. In the case of the photosensitive sheets, carrier strip 52 may comprise the light-opaque backing. The layer of fluid reagent, which is preferably quite viscous, serves to retain the two sheets together and to prevent exposure of the photosensitive sheet during processing following withdrawal of the sheets from the camera into the light. In this connection it may be advisable to provide a light-absorbing dye or a pigment in the fluid reagent to aid in preventing exposure of the photosensitive sheet during processing.

Superpositioning of the sheets and spreading of the fluid is accomplished by drawing the sheets in superposition between a pair of pressure-applying members. The pressure-applying members are preferably quite rigid so that they will not bend and are urged toward one another by some form of spring means. A novel pressure-applying device 76, embodying the foregoing features and which is simple and inexpensive to fabricate, being comprised of only two sheet metal blanks formed and secured together, is shown in Figs. 1, 4, 7 and 8 of the drawings. The blanks, designated 78 and 80, are preferably formed of resilient sheet metal and include, respectively, generally flat, elongated rectangular sections 82 and 84 and end sections 86 and 88 extending substantially perpendicularly therefrom. Blanks 78 and 80 are secured together at end sections 86 and 88 by such means as spot welding with the rectangular sections disposed at an acute angle (approximately 60°) with respect to one another to form a generally elongated channel having a V-shaped cross section. The longitudinal edges of sections 82 and 84, located closest one another at the apex of the V, are rolled outwardly to provide a pair of substantially rigid elongated pressure-applying members designated 90 and 92, respectively. The pressure-applying members provide a converging pressure-generating throat 94 through which a pair of photosensitive and second sheets are drawn in superposition for spreading a fluid processing reagent therebetween. Pressure-applying member 90 is at least equal in length to the width of the photosensitive and second sheets, while pressure-applying member 92 is slightly shorter, so that pressure is applied to the central portions of the sheets and not to the marginal portions thereof. This arrangement allows the margins of the sheets to spread apart slightly and thereby act as traps for any fluid reagent which may spread laterally from between the exposure frame of the photosensitive sheet and the picture area of the second sheet. In this regard, the mask formed by carrier strip 72 aids in confining the layer of fluid reagent to the desired area between each pair of superposed sheets.

Figure 8:
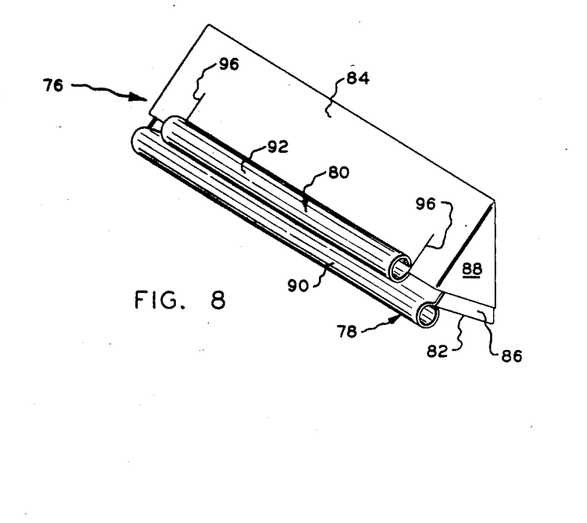
Fig. 8 is a perspective view of one component of the camera.

Rectangular section 84 is provided with a pair of slits 96 located at the ends of the roller portion comprising pressure-applying member 92 and extending inwardly from the edge of section 84. This arrangement permits flexure in the portion of section 84 located between slits 96 so that this portion functions as a cantilever spring for resiliently urging pressure-applying member 92 toward pressure-applying member 90. The force exerted by this spring portion is inversely proportional to the length of slits 96 which, in effect, determine the length of the spring portion and the pressure exerted thereby.

Pressure-applying device 76 is secured across opening 28 so as to engage a pair of photosensitive and second sheets as they are withdrawn from their respective chambers. Sections 82 and 84 of the device are located at the same angle with respect to one another as are rear wall 12 and lower wall 20 of the camera housing. In the preferred form shown, device 76 is secured to the housing with section 82 located within the housing against the forward or inner surface of rear wall 12 the end of which projects into the rear portion of section 82 comprising pressure-applying member 90, where the end is retained. End sections 86 and 88 of the device are also located within the camera housing against side walls 14 and 16 and elongated rectangular section 82 is located exterior of the end portion of lower wall 20. To retain the pressure-applying device in place, a strip 98 of adhesive tape, paper or other light-opaque sheet material is secured to section 84 and lower wall 20 and extends around the ends of section 84 where it is secured to side walls 14 and 16. The camera is assembled with carrier strips 52 and 72 extending from their respective storage chambers 32 and 36 into superposition and through throat 94 between pressure-applying members 90 and 92 from the camera.

To process a photosensitive sheet 50 following exposure thereof, the operator need only grasp the two leaders and withdraw the exposed photosensitive sheet and a second sheet from the camera through the pressure-applying members. The camera includes means for insuring that only one pair of sheets at a time are withdrawn from the camera. In the form shown, this means comprises a flange 100 turned up from an edge of elongated rectangular section 82 so as to extend forwardly across the lower end of chamber 32 and provide a narrow gap 102 between flange 100 and inner rear wall 30 through which the foremost photosensitive sheet is movable. Flange 100 retains the remaining photosensitive sheets within chamber 32 and, when the sheets are located within an envelope, retains the envelope within the chamber as well. A flange 104 is turned down from inner lower wall 34 so as to extend downward across the lower end of chamber 36 and provide a gap 106 between flange 104 and lower wall 20 through which a second sheet and a container attached thereto are movable, one at a time.

Additional means, in the form of a raised pad or boss 108, is provided on lower wall 20 adjacent slot 106 for aiding in limiting the movement of the second sheets from chamber 36 to one at a time. As the second sheet is withdrawn through gap 106, the container attached thereto, being somewhat rigid, is caused to pivot about a line intermediate its edges about the lower or rearmost edge of pad 108. In this way as one edge of the container is moved downward and rearward to pass through gap 106, the opposite or trailing edge of the container is pivoted upwardly away from lower wall 20, displacing the remaining second sheets and containers upward away from lower wall 20, so that they cannot enter gap 106. The inclusion of pad 108 is helpful since it may be difficult to accurately control the width of gap 106, especially when the housing is formed of cardboard, so that only one second sheet and container at a time will pass through the gap. The provision of pad 108 permits the gap to be wider than that required to admit the passages of only one second sheet and container, yet still permits the passage of the second sheets and containers, one at a time.

As previously noted, the carrier strips are folded so that there are two layers or folds of each carrier strip disposed between each photosensitive and second sheet. As a photosensitive or second sheet is withdrawn from its chamber, the folded end of the two layers of carrier strips must roll in the direction of movement of the sheet being moved between it and the next succeeding sheet. To facilitate this rolling of the carrier strip, the folded end is not creased sharply but is rolled so that it will have a tendency to continue to roll when withdrawn. In the case of carrier strip 52 located between photosensitive sheets 50, there is a strong tendency for both layers or folds of the carrier strip to be withdrawn simultaneously and thereby cause jamming. This is due to the fact that pressure is being applied to the stack of photosensitive sheets, causing friction to be generated between the two folds of the carrier strip. To prevent simultaneous movement of the two folds and subsequent jamming, the rearmost of each pair of folds, that is, the fold located adjacent each succeeding photosensitive sheet, is secured to the forward surface of that sheet along the margins thereof. By virtue of this arrangement the fold attached to the preceding sheet (being withdrawn) will move and the friction exerted thereby on the rear fold secured to the next succeeding photosensitive sheet is not sufficient to slide the last-mentioned fold, which must necessarily be peeled back upon itself from the succeeding photosensitive sheet. This arrangement will also facilitate assembly or leading of the stack of photosensitive sheets into the camera since the two folds of the carrier strip located between each pair of photosensitive sheets are secured to the two sheets, retaining them together and aiding in preventing the admission of light between the sheets. When carrier strip 52 provides the opaque backing for the photosensitive sheets and is secured to the light-sensitive surface of each photosensitive sheet, it will prevent exposure of the photosensitive sheets during the loading operation, and it may prove unnecessary, therefore, to provide the photosensitive sheets in an envelope to facilitate loading.

Figure 10:
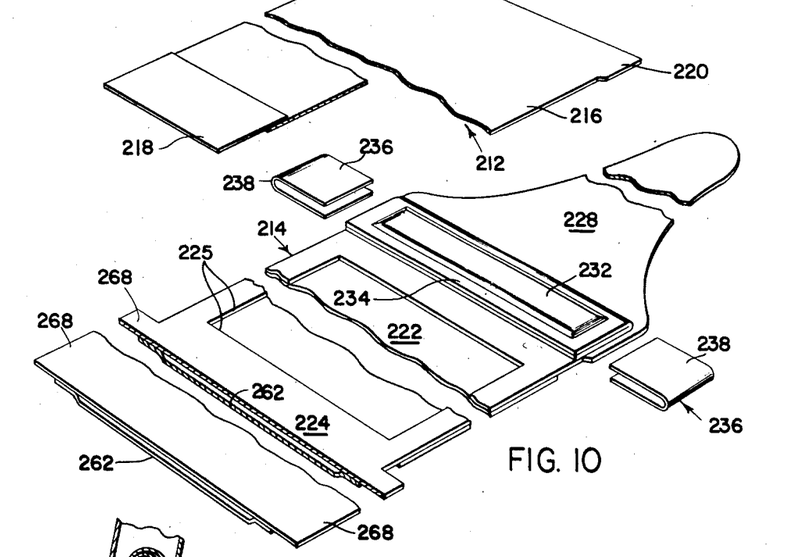
Fig. 10 is an exploded, fragmentary, perspective view of another form of film assemblage embodied in the product of the invention.
Figure 11:
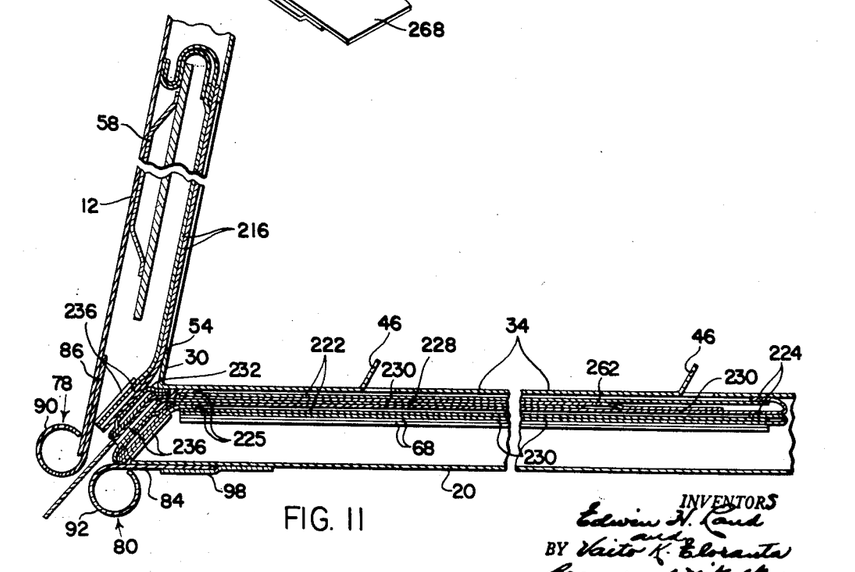
Fig. 11 is a fragmentary sectional view of the product of the invention showing the arrangement of the photographic film units of Fig. 10.

Other embodiments of the film units contained in the camera housing are possible and include, for example, film units and assemblages of the type illustrated in Figs. 10 and 11 and described in greater detail in the copending application, Serial No. 696,505, filed November 14, 1957, in the name of William H. Eburn, Jr. The product of the invention includes a plurality of units, each comprising a photosensitive element 212 and a second or print-receiving element 214. Both the photosensitive and second elements are in the form of sheets with photosensitive element 212 comprising a photosensitive sheet 216 and a trailer sheet 218 secured to the trailing end of the photosensitive sheet. Trailer sheet 218 comprises a thin sheet material such as paper which is preferably substantially thinner than the overall thickness of photosensitive sheet 216. Photosensitive sheet 216 is provided with lateral flanges 220 at its leading end which project slightly outward and have lateral edges diverging slightly toward the leading edge of the photosensitive sheet.

Second or print-receiving element 214 comprises a second or print-receiving sheet 222, similar in shape to the photosensitive sheet and at least coextensive with the area or exposure frame thereof which is to be exposed. In the preferred form shown, second sheet 222 is of the same width as, but slightly shorter than, photosensitive sheet 216. Print-receiving sheet 222 is mounted on a leader or carrier sheet 224 which, like trailer sheet 218, is formed of a thin sheet material, such as paper, which is comparatively thin yet strong. The print-receiving sheet is mounted on the side of the carrier sheet opposite the side thereof which is intended to be superposed with the photosensitive element and at a position intermediate the ends of the carrier sheet. Carrier sheet 224 is provided with an aperture 225, preferably rectangular, overlying print-receiving sheet 222 and defining the area thereof in contact with which a fluid processing reagent is spread and in which a transfer print is formed.

Carrier sheet 224 is also provided with a pair of lateral flanges 226 similar to flanges 220 and located adjacent the leading edge of second sheet 222. Carrier sheet 224 includes a leading end section 228 which may be tapered so that it is substantially narrower than the remainder of the carrier sheet and provides a leader for the film unit, of which it is a component, and a trailing end section 230 which, in the form shown, is at least equal in length to second sheet 222.

The photosensitive element, following exposure, is adapted to be superposed with the print-receiving element and the two elements moved in superposition between pressure-applying members 80 and 82 for spreading a fluid processing reagent in a thin layer between the photosensitive and print-receiving sheets of the two elements. In the form shown in the drawings, the fluid processing reagent is provided in a rupturable container 232, similar in construction to container 74, attached to carrier sheet 224 on the side thereof opposite second sheet 222 between the superposed sheets adjacent the leading edge of the second sheet. Container 232 is mounted on carrier sheet 224 with the longitudinal sealed portion, designated 234, extending transversely of the carrier sheet and located adjacent the leading edge of aperture 225 and print-receiving sheet 222 so that the application of compressive pressure to the container will cause the discharge of its contents in the direction of the area of sheets 216 and 222 between which said fluid is to be spread. For best results the fluid-carrying cavity of the container should be substantially equal in length to the width of aperture 225 so that the fluid contents of the container will be released therefrom in an elongated mass extending substantially from side to side of the area over which it is to be spread.

Provision is made for preventing exposure of the photosensitive layer of photosensitive sheet as film unit 212 is withdrawn from the camera. This may be accomplished, for example, by providing the supports for photosensitive sheet 216 and second sheet 222 of a material, or with a coating of a material, which is opaque to actinic light. As the fluid processing reagent is distributed between the two sheets, it functions as an adhesive for holding the photosensitive and print-receiving sheets in superposition. Prevention of the exposure of the photosensitive sheet by light entering between the margins of the sheets can be further assured by providing a light-absorbing dye or pigment in the fluid processing reagent.

As previously noted, the film assemblages of the invention comprise a plurality of individual film units, each, in turn, comprising a second element and a photosensitive element adapted to be exposed while positioned apart from the second element. Each film unit comprises a single leader and is processed by being withdrawn with the aid of the leader from the assemblage between a pair of pressure-applying members. The film units of the assemblage are arranged with all the photosensitive sheets in one stack and all the second sheets in a second stack. The photosensitive and print-receiving layers of the photosensitive and second sheets are disposed innermost and it is the innermost film unit which is intended to be exposed and processed first, and the photosensitive and second sheets of subsequent film units are arranged outwardly from the first film unit.

In order the the film units can be withdrawn in succession from the assemblage with the aid of a single leader attached to each film unit, the photosensitive and second elements of each film unit must be secured to one another in such a manner that the photosensitive and second sheets can be positioned apart during exposure, the photosensitive and second sheets are registered with one another when they are superposed and the innermost photosensitive and second elements can be withdrawn from the assemblage between the photosensitive and second elements of subsequent film units. The photosensitive element 212 and second element 214 of each film unit are secured together adjacent the leading ends of photosensitive sheet 216 and second sheet 222 at flanges 220 and 226. For this purpose, there is provided a pair of connecting elements, designated 236 and comprising strips of sheet material secured near the lateral margins of the elements to the outer surfaces of photosensitive sheet 216 and carrier sheet 224. Connecting elements 236 may comprise strips of paper, fabric or plastic material coated with an adhesive, the last-mentioned materials including cellophane tape, "Mylar" tape being particularly suitable for this purpose.

Flanges 220 and 226 cooperate with the connecting elements when they comprise an adhesive tape by adhering to the adhesive of the connecting elements at the connecting portions 238 thereof which extend between the edges of the photosensitive and second elements to provide means for strengthening the connecting elements in these portions and for preventing the adhesive from adhering to the previous film unit and preventing withdrawal thereof from the assemblage. In one form of the product, the flanges may themselves comprise the connecting elements. In the form shown, however, they perform still another function. By having divergent edges, flanges 220 and 226 cause connecting portions 238 of elements 236 to be spaced outwardly slightly from the edges of the photosensitive and second elements and facilitate movement of each film unit between the connecting elements of the succeeding film units. The divergence of the flanges and the connecting portions further facilitates assembly of the film units between successive film units as well as withdrawal of the film units, one at a time and in proper succession.

In still another form of film unit, second sheet 222 may be equal in length to photosensitive sheet 216 and the two sheets may be secured together at their leading ends by the connecting elements. Leading end section 228 may, in this embodiment, comprise a portion of a carrier sheet for the second sheet (as shown), or section 228 may comprise a separate sheet attached to the leading end of the second sheet.

The photosensitive elements are mounted within chamber 32 between walls 12 and 30 by a pressure plate 56 and spring 58 mounted on rear wall 12. Print receiving elements 14 are mounted in chamber 36 between walls 10 and 34.

It is desirable that only one leader at a time project from the camera between the pressure-applying members and, since there is one leader for each film unit, means are provided comprising each film unit for feeding the leader of the next successive film unit between the rolls and from the camera as each film unit is withdrawn so that the leaders can be grasped. This means comprises a second trailer sheet 262 secured in face-to-face relation to trailing end section 230 along the lateral margins of the second trailer sheet and adjacent the trailing ends of second sheet 222. The trailing end section and trailer sheet are secured together so as to provide an envelope 264 open at the trailing end of second element 214. Envelope 264 is folded back upon the carrier sheet of the second element so as to extend between the second element and the next successive second element. The leading end section 228 of this next successive second element is folded forwardly upon the second sheet so that it projects into envelope 264. Thus, as a film unit is withdrawn from the assemblage between the pressure-applying members, envelope 264, containing the leading end section 228 of the next successive film unit, carries the leading end section along with the envelope to provide a leader projecting between the pressure-applying members and connected to the next successive film unit.

As a film unit is withdrawn from the film assemblage, frictional forces are generated between it and succeeding film units, tending to move the succeeding film units. Accordingly, means are provided for retaining the film units stationary during withdrawal of one of them as well as for preventing envelope 264 from bunching up and jamming as the film unit of which it is a part is withdrawn. For this purpose, trailing end sections 230 are substantially wider than trailer sheets 262, attached thereto, and include lateral side portions 268 which are folded inwardly toward one another and are secured to lower wall 20 so that, as a film unit is withdrawn, trailing end section 230 is torn near its margins and adjacent the margins of second trailer sheet 262. Tearing of trailing end section 230 is progressive, commencing adjacent the trailing end of the print-receiving sheet so that envelope 264 cannot buckle or gather and become jammed.

Trailer sheet 218 and envelope 264 perform still another function and that is to collect or trap any excess fluid which may be squeezed from between the trailing ends of the photosensitive and second sheets. The sheet materials comprising trailer sheet 218, trailing end section 230 and trailer sheet 262 are substantially thinner in aggregate than the combined thickness of the photosensitive and second elements in the region of the second sheet. By virtue of this construction the pressure-applying members can be constructed so as to have a minimum gap width which approximates this thickness of the combined photosensitive and second elements, whereby a space is provided between trailer sheet 218 and envelope 264 as they are moved between the pressure-applying members. It is in this space between the trailer sheet and the envelope that any excess processing fluid is trapped and retained. The portions of the intermediate section of carrier sheet 224 bordering aperture 225 and secured to second sheet 222 function as a mask during spreading of the fluid and aid in controlling the thickness of the layer of fluid and the area of contact between the fluid and the print-receiving sheet whereby a border is formed on the transfer print produced on sheet 222.

It is desirable that the film assemblage be as short as possible and for this purpose the trailer sheet 218 of each photosensitive sheet is folded back between it and succeeding photosensitive sheets and even behind pressure plate 56. In order to cause the trailer sheet to unfold as the photosensitive element is withdrawn from the assemblage between the pressure-applying members, each trailer sheet 218 is folded first back toward the leading end of the photosensitive sheet which it comprises, behind pressure plate 56 and then back upon itself toward the trailing end of the photosensitive sheet. The end portion is secured by a strippable adhesive to the end portion of the next succeeding trailer sheet with the end portion of the last trailer sheet being secured to rear wall 12.

Envelope means (not shown) may be provided for enclosing the film units of the assemblage to protect them, hold them together and permit assembly of the product in the light by preventing exposure of the photosensitive sheets. Such an envelope might comprise, for example, a first envelope for the stack of photosensitive elements 212 and a second envelope for the stack of second elements 214 and a backing element within the second envelope, to which side portions 268 are secured.

Other forms of film assemblages may be provided in the product of the invention and these include, for example, film assemblages of the type disclosed in the copending application Serial No. 667,882, filed June 25, 1957 in the name of Edwin H. Land.

The camera includes a lens and shutter assembly, designated 110, secured across the forward open end of the camera housing and chamber 26. The lens and shutter assembly includes a housing having a recess 112 around its rear portion in which the forward edge sections of lower wall 20, side walls 14 and 16 and upper wall 18 project for sealing the housing against the admission of light. The lens and shutter assembly may be of any conventional design, preferably one whose construction is simple and inexpensive, inasmuch as the entire camera assembly is intended to be discarded when the photosensitive and second sheets, with which it is provided, have been expended.

Figure 9:
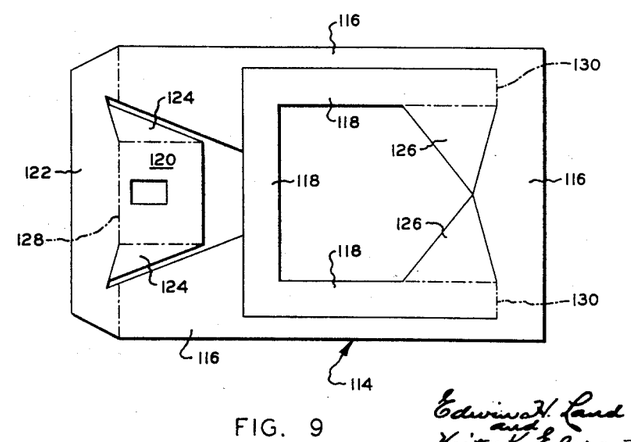
Fig. 9 is a plan view of a blank of sheet material comprising a view finder for the product of the invention.

The camera is provided with a view finder, also formed from a single blank of sheet material, preferably stiff paper or cardboard. A blank 114, which forms the view finder, is shown in Fig. 9 of the drawings and is generally rectangular in shape, the broken lines in the drawing being employed to indicate where the blank is to be folded. The blank comprises a first rectangular section 116 cut to provide a U-shaped front frame 118 and a rectangular rear frame 120. At the end of rectangular section 116 there is provided a flap 122. Flap 122 is secured to rear wall 12 of the camera housing, while the portions of first rectangular section 116 surrounding the front and rear frames are secured to upper wall 18 of the camera housing. Rear frame 120 is provided with a pair of lateral triangular members 124 adapted to act as braces for holding the frame in an erect position. Front frame 118 also includes a pair of triangular members 126 which project inwardly toward one another adjacent the forward end of the frame.

The camera is initially provided with the two frames located flat against the upper wall of the housing. When the operator desires to use the camera, the rear frame, which is initially folded along line 128, is pivoted to an erect position and triangular members 124 are folded forward to act as braces to hold rear frame 120 in a plane substantially parallel to the plane of rear wall 12. Front frame 118 is folded forward and upward about line 130 to a position in a plane substantially parallel with the plane of the rear frame and triangular members 126 are folded rearwardly to retain the forward frame in this position.

As the photosensitive sheet and second sheet are withdrawn in superposition between the pressure-applying members, the fluid processing reagent, carried in a container attached to the second sheet, is spread in a thin layer between the photosensitive and second sheets, effecting the processing thereof, preferably to form a positive print in the second sheet. The layer of fluid reagent is preferably quite viscous and serves to adhere the two sheets together as they are withdrawn from the camera. To prevent exposure of the photosensitive sheet, both sheets are opaque to actinic light or are provided with opaque backing layers which, in the case of the photosensitive sheets, may comprise the carrier strip. To aid in preventing exposure of the photosensitive sheet, a light-absorbing pigment or dye may be provided in the fluid reagent itself. The sandwich comprising the two sheets and layer of fluid reagent is maintained for a predetermined processing period, at the end of which the photosensitive and second sheets are stripped apart. The adhesive employed to secure carrier strip 72 to second sheets 70 is preferably so constituted that the carrier strip remains adhered to the photosensitive sheet and is stripped from the second sheets, leaving a finished photographic print.

Since certain changes may be made in the above product and apparatus without departing from the scope of the invention herein involved, it is intended that all matter contained in the above description or shown in the accompanying drawings shall be interpreted as illustrative and not in a limiting sense.

What is claimed is:

1. A photographic product in the form of a box camera containing photographic materials for taking a plurality of pictures and producing a plurality of prints, said product being constructed so that said camera can be discarded when the materials initially provided therein have been expended and comprising, in combination, a casing fabricated entirely of thin sheet material, said casing comprising a first blank including sections folded to define a rear wall, two side walls and convergent upper and lower walls with an opening at the intersection of said rear and lower walls and a second blank including sections comprising a first inner wall located adjacent said rear wall and cooperating therewith to provide a first chamber and a second inner wall located adjacent and spaced from said lower wall to provide a second chamber disposed at an angle with respect to said first chamber, said first and second inner walls cooperating with said upper and side walls to provide a tapered exposure chamber, a lens and shutter assembly mounted on said casing at the front of said exposure chamber, a plurality of photosensitive sheets, second sheets and rupturable containers carrying a fluid processing agent each associated with one of said second sheets, said fluid processing agent being capable of effecting the formation of a positive photographic print when distributed between one of said photosensitive sheets and a second sheet superposed therewith following exposure of said one photosensitive sheet, means associated with said opening in said casing for superposing a photosensitive sheet with a second sheet and spreading said fluid processing agent from the container associated therewith in a thin layer between said sheets as said sheets are withdrawn from said casing for processing the last-mentioned photosensitive and second sheets together as a unit, the last-mentioned means comprising a pair of pressure-applying members between which said sheets are moved, and leader means for withdrawing said photosensitive and said second sheets in superposition in succession from said casing between said pressure-applying members, at least a part of said leader means initially extending from said casing between said pressure-applying members.

2. The photographic product of claim 1 wherein each of said photosensitive sheets is connected to a second sheet.

3. A photographic product in the form of a box camera containing photographic materials for taking a plurality of pictures and producing a plurality of prints, said product being constructed so that said camera can be discarded when the materials initially provided therein have been expended and comprising, in combination, a casing fabricated entirely of thin sheet material, said casing comprising a first blank including sections folded to define a rear wall, two side walls and convergent upper and lower walls with an opening at the intersection of said rear and lower walls and a second blank including sections comprising a first inner wall located adjacent said rear wall and cooperating therewith to provide a first chamber and a second inner wall located adjacent and spaced from said lower wall to provide a second chamber disposed at an angle with respect to said first chamber, said first and second inner walls cooperating with said upper and side walls to provide a tapered exposure chamber, a lens and shutter assembly mounted on said casing at the front of said exposure chamber, a plurality of photosensitive sheets arranged in stacked relation within said first chamber, a plurality of second sheets arranged in stacked relation within said second chamber, a plurality of rupturable containers carrying a fluid processing agent associated with said second sheets in said second chamber, said fluid processing agent being capable of effecting the formation of a positive photographic print when distributed between one of said second sheets and an exposed photosensitive sheet superposed with said one second sheet, means associated with said opening in said casing for superposing a photosensitive sheet with a second sheet and spreading said processing agent from one of said containers in a thin layer between the superposed sheets as they are withdrawn from their respective first and second chambers to process the superposed sheets as a unit, the last-mentioned means comprising a pair of pressure-applying members between which said sheets are withdrawn from said casing, and leader means for withdrawing each of said photosensitive sheets in superposition with one of said second sheets from said casing between said pressure-applying members, said leader means including a portion initially extending from said casing between said pressure-applying members.

4. The photographic product of claim 3 wherein said casing of said camera comprises two blanks of cardboard, the first of said blanks including portions providing a rear wall, generally parallel side walls and convergent upper and lower walls for said casing, the second of said blanks including portions providing a first inner wall defining, in conjunction with said rear wall, said first chamber and a second inner wall defining, in conjunction with said lower wall, said second chamber, said first inner wall including an aperture through which light may be transmitted for exposing said sheets located within said first chamber.

5. The photographic product of claim 4 wherein said second blank includes a section providing a third inner wall secured to said upper wall of said casing, said third inner wall and said second inner wall having portions folded inwardly to provide baffles for reducing light reflections within said exposure chamber.

6. A photographic product in the form of a box camera containing photographic materials for taking a plurality of pictures and producing a plurality of prints, said product being constructed so that said camera can be discarded when the materials initially provided therein have been expended and comprising, in combination, a casing fabricated entirely of thin sheet material, said casing comprising a first blank including sections folded to define a rear wall, two side walls and convergent upper and lower walls with an opening at the intersection of said rear and lower walls and a second blank including sections comprising a first inner wall located adjacent said rear wall and cooperating therewith to provide a first chamber and a second inner wall located adjacent and spaced from said lower wall to provide a second chamber disposed at an angle with respect to said first chamber, said first and second inner walls cooperating with said upper and side walls to provide a tapered exposure chamber, a lens and shutter assembly mounted on said casing at the front of said exposure chamber, a plurality of photosensitive sheets arranged in stacked relation and mounted on a carrier strip within said first chamber, a plurality of second sheets arranged in stacked relation and a plurality of rupturable containers carrying a fluid processing reagent mounted together on a second carrier strip within said second chamber, said fluid processing reagent being capable of effecting the formation of a positive photographic print when distributed between one of said second sheets and an exposed photosensitive sheet superposed with said one second sheet, and means associated with said opening in said casing for superposing a photosensitive sheet with a second sheet and spreading said fluid processing reagent from one of said containers in a thin layer between said sheets as said sheets are withdrawn from their respective first and second chambers, the last-mentioned means comprising a pair of pressure-applying members between which said sheets are withdrawn from said casing, said product being provided with portions of said first and second carrier strips extending from their respective first and second chambers between said pressure-applying members.

7. A photographic product in the form of a box camera containing photographic materials and adapted to be discarded following employment for making a plurality of exposures and producing a plurality of positive prints with the materials initially provided therein, said camera comprising, in combination, a casing entirely formed of thin cardboard and providing a tapered exposure chamber, a first chamber located at the rear of said exposure chamber, a second chamber located at one side of said exposure chamber and disposed at an angle with respect to said first chamber and an opening in said casing at adjacent ends of said first and second chambers, exposure means mounted on said casing at the front of said exposure chamber, a plurality of photosensitive sheets arranged in stacked relation within said first chamber at the rear of said exposure chamber, a first leader strip mounting and interconnecting said photosensitive sheets whereby said sheets may be withdrawn in succession from said first chamber through said opening in said casing, means within said first chamber for holding the forwardmost of said photosensitive sheets in position for exposure, a plurality of second sheets arranged in stacked relation within said second chamber, a second leader strip mounting and interconnecting said photosensitive sheets whereby said second sheets may be withdrawn in succession from said second chamber through said opening in said casing, a plurality of containers carrying a fluid reagent for processing said photosensitive sheets when distributed thereon, said containers being so associated with said second sheets as to be movable therewith from said second chamber, and means secured across said opening in said casing for superposing a photosensitive sheet and a second sheet, as they are withdrawn from their respective first and second chambers, and spreading said fluid reagent in a layer between the superposed sheets, the last-mentioned means including a pair of pressure-applying members between which a photosensitive sheet and a second sheet are moved in superposition for spreading said fluid reagent from one of said containers located between the superposed sheets, said product being provided with portions of said first and second leader strips extending in superposition from said casing between said pressure-applying members.

8. The product of claim 7 wherein said means for superposing a photosensitive and second sheet and spreading said fluid reagent therebetween includes means for partially closing said first chamber to provide a narrow opening therein through which said photosensitive sheets are movable, one at a time, from said first chamber, and said casing includes means for restricting the movement of said second sheets to one at a time from said second chamber.

9. The photographic product of claim 7 wherein said casing of said camera comprises two blanks of cardboard, the first of said blanks including portions providing a rear wall, generally parallel side walls and convergent upper and lower walls for said casing, the second of said blanks including portions providing a first inner wall defining, in conjunction with said rear wall, said first chamber and a second inner wall defining, in conjunction with said lower wall, said second chamber, said first inner wall including an aperture through which light may be transmitted for exposing said sheets located within said first chamber.

10. The photographic product of claim 9 wherein said second blank includes a section providing a third inner wall secured to said upper wall of said casing, said third inner wall and said second inner wall having portions folded inwardly to provide baffles for reducing light reflections within said exposure chamber.

11. A photographic product in the form of a camera including photographic materials required for the production of a plurality of photographic prints, said camera being adapted to be discarded following employment for taking a plurality of pictures and for producing a plurality of prints with the materials initially comprising said product, said product comprising, in combination, a plurality of photosensitive sheets, a plurality of second sheets and rupturable containers each carrying a fluid processing reagent capable of producing a positive photographic print in one of said second sheets when distributed between said one second sheet and an exposed photosenstive sheet superposed with said one second sheet, casing means for housing said photosensitive sheets, second sheets and containers of fluid processing reagent, said photosensitive sheets being mounted on a first carrier strip and arranged in stacked relation within said casing, said second sheets being arranged in stacked relation apart from said photosensitive sheets and being mounted together with said containers of fluid processing reagent, on a second carrier strip, a photographic lens and shutter assembly, said casing including means for mounting said lens and shutter assembly and locating said photosensitive sheets, relative to the lens of said assembly, with one of said photosensitive sheets in position for exposure, said casing including means providing an opening in said casing through which said photosensitive and second sheets can be withdrawn, pressure-applying means associated with said opening for superposing a photosensitive and second sheet as said sheets are withdrawn simultaneously from said casing and spreading the fluid processing reagent carried by one of said containers in a thin layer between said superposed photosensitive and second sheets, said pressure-applying means comprising a pair of pressure-applying members between which said sheets are moved, said casing being permanently assembled and formed entirely of sheet material comprising two blanks of cardboard, one of said blanks including portions providing outer walls for said casing and the other of said blanks including portions providing at least two inner walls cooperating with said outer walls for locating said photosensitive and second sheets in stacks apart from one another and with said photosensitive sheets in position for exposure.

12. A photographic product in the form of a camera including photographic materials required for the production of a plurality of photographic prints, said camera being adapted to be discarded following employment for taking a plurality of pictures and for producing a plurality of prints with the materials initially comprising said product, said product comprising, in combination, a plurality of photosensitive sheets, a plurality of second sheets and rupturable containers each carrying a fluid processing reagent capable of producing a positive photographic print in one of said second sheets when distributed between said one second sheet and an exposed photosensitive sheet superposed with said one second sheet, casing means for housing said photosensitive sheets, second sheets and containers of fluid processing reagent, said photosensitive sheets being mounted on a first carrier strip and arranged in stacked relation within said casing, said second sheets being arranged in stacked relation apart from said photosensitive sheets and being mounted, together with said containers of fluid processing reagent, on a second carrier strip, a photographic lens and shutter assembly, said casing including means for mounting said lens and shutter assembly and locating said photosensitive sheets, relative to the lens of said assembly, with one of said photosensitive sheets in position for exposure, said casing including means providing an opening in said casing through which said photosensitive and second sheets can be withdrawn, and pressure-applying means associated with said opening for superposing a photosensitive and second sheet as said sheets are withdrawn simultaneously from said casing and spreading the fluid processing reagent carried by one of said containers in a thin layer between said superposed photosensitive and second sheets, said pressure-applying means comprising a pair of pressure-applying members between which said sheets are moved, said casing being permanently assembled, formed entirely of sheet material and including a first storage chamber containing said second sheets and portions of said first and second carrier strips extending from said first and second chambers into superposition between said pressure-applying members.

13. A photographic product in the form of a camera including photographic materials required for producing a plurality of photographic prints, said camera being adapted to be discarded following employment for taking a plurality of pictures and for producing a plurality of prints with the materials initially comprising said product, said product comprising, in combination, a plurality of photosensitive sheets, a plurality of second sheets and rupturable containers each carrying a fluid processing reagent capable of producing a positive photographic print in one of said second sheets when distributed between said one second sheet and an exposed photosensitive sheet superposed with said one second sheet, casing means for housing said photosensitive sheets, second sheets and containers of fluid processing reagent, said photosensitive sheets being mounted on a first carrier strip and arranged in stacked relation within said casing, said second sheets being arranged in stacked relation apart from said photosensitive sheets and being mounted, together with said containers of fluid processing reagent, on a second carrier strip, a photographic lens and shutter assembly, said casing including means for mounting said lens and shutter assembly and locating said photosensitive sheets, relative to the lens of said assembly, with one of said photosensitive sheets in position for exposure, said casing including means providing an opening in said casing through which said photosensitive and second sheets can be withdrawn, pressure-applying means associated with said opening for superposing a photosensitive and second sheet as said sheets are withdrawn simultaneously from said casing and spreading the fluid processing reagent carried by one of said containers in a thin layer between said superposed photosensitive and second sheets, said pressure-applying means comprising a pair of pressure-applying members between which said sheets are moved, said casing being permanently assembled, formed entirely of thin sheet material and comprising a first blank having generally rectangular sections providing a rear wall, upper wall and lower wall, two generally triangular sections providing side walls for said casing and flaps along an edge of at least three of said sections for securing said sections together to form said casing, and a second blank comprising a first rectangular section providing a first inner wall mounted within said casing in a plane generally parallel to the plane of said rear wall and spaced from said rear wall for providing a first chamber containing said first sheets, said first inner wall having a generally rectangular exposure aperture and being located with its rear surface substantially in the focal surface of said lens, and a second rectangular section providing a second inner wall so located with respect to, and spaced from, said lower wall as to provide a second chamber containing said second sheets.

14. A photographic product in the form of a camera including photographic materials required for producing a plurality of photographic prints, said camera being adapted to be discarded following employment for taking a plurality of pictures and for producing a plurality of prints with the materials initially comprising said product, said product comprising, in combination, a plurality of photosensitive sheets, a plurality of second sheets and rupturable containers each carrying a fluid processing reagent capable of producing a positive photographic print in one of said second sheets when distributed between said one second sheet and an exposed photosensitive sheet superposed with said one second sheet, casing means for housing said photosensitive sheets, second sheets and containers of fluid processing reagent, said photosensitive sheets being mounted on a first carrier strip and arranged in stacked relation within said casing, said second sheets being arranged in stacked relation apart from said photosensitive sheets and being mounted, together with said containers of fluid processing reagent, on a second carrier strip, a photographic lens and shutter assembly, said casing including means for mounting said lens and shutter assembly and locating said photosensitive sheets, relative to the lens of said assembly, with one of said photosensitive sheets in position for exposure, said casing including means providing an opening in said casing through which said photosensitive and second sheets can be withdrawn, pressure-applying means associated with said opening for superposing a photosensitive and second sheet as said sheets are withdrawn simultaneously from said casing and spreading the fluid processing reagent carried by one of said containers in a thin layer between said superposed photosensitive and second sheets, said pressure-applying means comprising a pair of pressure-applying members between which said sheets are moved, said casing being permanently assembled, formed entirely of thin sheet material and comprising a first blank having generally rectangular sections providing a rear wall, upper wall and lower wall, two generally triangular sections providing side walls for said casing and flaps along an edge of at least three of said sections for securing said sections together to form said casing, a second blank comprising a first rectangular section providing a first inner wall mounted within said casing in a plane generally parallel to the plane of said rear wall and spaced from said rear wall for providing a chamber containing said photosensitive sheets, said first inner wall having a generally rectangular exposure aperture and being located with its rear surface substantially in the focal surface of said lens, a second rectangular section providing a second inner wall so located with respect to, and spaced from, said lower wall as to provide a second chamber containing said second sheets, and a third generally rectangular section secured in superposition to the inner surface of said upper wall, said second and third rectangular sections including a plurality of portions folded inwardly to provide baffles for restricting light reflection within the chamber defined by the last-mentioned sections and said side walls and said first inner wall.

15. A photographic product in the form of a camera including photographic materials required for producing a plurality of photographic prints, said camera being adapted to be discarded following employment for taking a plurality of pictures and for producing a plurality of prints with the materials initially comprising said product, said product comprising, in combination, a plurality of photosensitive sheets, a plurality of second sheets and rupturable containers each carrying a fluid processing reagent capable of producing a positive photographic print in one of said second sheets when distributed between said one second sheet and an exposed photosensitive sheet superposed with said one second sheet, casing means for housing said photosensitive sheets, second sheets and containers of fluid processing reagent, said photosensitive sheets being mounted on a first carrier strip and arranged in stacked relation within said casing, said second sheets being arranged in stacked relation apart from said photosensitive sheets and being mounted, together with said containers of fluid processing reagent, on a second carrier strip, a photographic lens and shutter assembly, said casing including means for mounting said lens and shutter assembly and locating said photosensitive sheets, relative to the lens of said assembly, with one of said photosensitive sheets in position for exposure, said casing including means providing an opening in said casing through which said photosensitive and second sheets can be withdrawn, pressure-applying means associated with said opening for superposing a photosensitive and second sheet as said sheets are withdrawn simultaneously from said casing and spreading the fluid processing reagent carried by one of said containers in a thin layer between said superposed photosensitive and second sheets, said pressure-applying means comprising a pair of pressure-applying members between which said sheets are moved, said casing being permanently assembled, formed entirely of thin sheet material and comprising a first blank having generally rectangular sections providing a rear wall, upper wall and lower wall, two generally triangular sections providing side walls for said casing and flaps along an edge of at least three of said sections for securing said sections together to form said casing, and a second blank comprising a first rectangular section providing a first inner wall mounted within said casing in a plane generally parallel to the plane of said rear wall and spaced from said rear wall for providing a first chamber containing said first sheets, said first inner wall having a generally rectangular exposure aperture and being located with its rear surface substantially in the focal surface of said lens and a second rectangular section providing a second inner wall so located with respect to, and spaced from, said lower wall as to provide a second chamber containing said sheets, said second rectangular section including a portion adjacent the intersection of said second inner wall and said first inner wall folded outward toward said lower wall to form a partial closure for said second chamber providing a narrow opening therein through which said second sheets and containers are movable, one at a time, from said second chamber.

16. A photographic product in the form of a camera including photographic materials required for producing a plurality of photographic prints, said camera being adapted to be discarded following employment for taking a plurality of pictures and for producing a plurality of prints with the materials initially comprising said product, said product comprising, in combination, a plurality of photosensitive sheets, a plurality of second sheets and rupturable containers each carrying a fluid processing reagent capable of producing a positive photographic print in one of said second sheets when distributed between said one second sheet and an exposed photosensitive sheet superposed with said one second sheet, casing means for housing said photosensitive sheets, second sheets and containers of fluid processing reagent, said photosensitive sheets being mounted on a first carrier strip and arranged in stacked relation within said casing, said second sheets being arranged in stacked relation apart from said photosensitive sheets and being mounted, together with said containers of fluid processing reagent, on a second carrier strip, a photographic lens and shutter assembly, said casing including means for mounting said lens and shutter assembly and locating said photosensitive sheets, relative to the lens of said assembly, with one of said photosensitive sheets in position for exposure, said casing including means providing an opening in said casing through which said photosensitive and second sheets can be withdrawn, pressure-applying means associated with said opening for superposing a photosensitive and second sheet as said sheets are withdrawn simultaneously from said casing and spreading the fluid processing reagent carried by one of said containers in a thin layer between said superposed photosensitive and second sheets, said pressure-applying means comprising a pair of pressure-applying members between which said sheets are moved, said casing being permanently assembled, formed entirely of thin sheet material and comprising a first blank having generally rectangular sections providing a rear wall, upper wall and lower wall, two generally triangular sections providing side walls for said casing and flaps along an edge of at least three of said sections for securing said sections together to form said casing, a second blank comprising a first rectangular section providing a first inner wall mounted within said casing in a plane generally parallel to the plane of said rear wall and spaced from said rear wall for providing a first chamber containing said first sheets, said first inner wall having a generally rectangular exposure aperture and being located with its rear surface substantially in the focal surface of said lens and a second rectangular section providing a second inner wall so located with respect to, and spaced from, said lower wall as to provide a second chamber containing said sheets, said second rectangular section including a portion adjacent the intersection of said second inner wall and said first inner wall folded outward toward said lower wall to form a partial closure for said second chamber providing a narrow opening therein through which said second sheets and containers are movable, one at a time, from said second chamber, and a panel formed of sheet material secured to the inner surface of said lower wall within said second chamber adjacent said narrow opening therein.

17. A photographic device for exposing and processing a plurality of photosensitive sheets for producing a plurality of positive prints by diffusion transfer and being so constructed as to be disposable after the plurality of pictures have been taken and processed to form positives, said device comprising, in combination, a housing, a shutter, a pressure-applying device through which an exposed photosensitive sheet and a second sheet are withdrawn from said housing in superposition for spreading a fluid processing agent in a layer therebetween, a plurality of photosensitive sheets arranged in stacked relation against one wall of said housing with one of said sheets in position for exposure, a plurality of second sheets arranged in stacked relation against another wall of said housing, means connecting said photosensitive sheets to one another and providing a leader attached to said one photosensitive sheet located in position for exposure and extending from said housing through said pressure-applying device, means connecting said second sheets with one another and providing a leader extending in superposition with the first-mentioned leader from said housing through said pressure-applying device, said housing being permanently assembled and formed of sheet material comprising two blanks of cardboard, one of said blanks including portions providing outer walls for said housing and the other of said blanks including portions providing at least two inner walls for locating said photosensitive and second sheets in stacks apart from one another and with said photosensitive sheets in position for exposure.

18. A photographic device for exposing and processing a plurality of photosensitive sheets for producing a plurality of positive prints by diffusion transfer and being so constructed as to be disposable after the plurality of pictures have been taken and processed to form positives, said device comprising, in combination, a housing, a lens and shutter assembly, a pressure-applying device through which an exposed photosensitive sheet and a second sheet are withdrawn from said housing in superposition for spreading a fluid processing agent in a layer therebetween, a plurality of photosensitive sheets arranged in stacked relation against one wall of said housing with one of said sheets in position for exposure, a plurality of second sheets arranged in stacked relation against another wall of said housing, means connecting said photosensitive sheets to one another and providing a leader attached to said one photosensitive sheet located in position for exposure and extending from said housing through said pressure-applying device, means connecting said second sheets with one another and providing a leader extending in superposition with the first-mentioned leader from said housing through said pressure-applying device, said housing being permanently assembled and formed entirely of thin sheet material comprising a first blank having generally rectangular sections providing a rear wall, upper wall and lower wall, two generally triangular sections providing side walls for said housing and flaps along an edge of at least three of said sections for securing said sections together to form said housing, and a second blank comprising a first rectangular section providing a first inner wall mounted within said housing in a plane generally parallel to the plane of said rear wall and spaced from said rear wall for providing a first chamber containing said sheets, said first inner wall having a generally rectangular exposure aperture and being located with its rear surface substantially in a focal surface of said lens, and a second rectangular section providing a second inner wall so located with respect to, and spaced from, said lower wall as to provide a second chamber containing said second sheets.

19. A photographic device for exposing and processing a plurality of photosensitive sheets for producing a plurality of positive prints by diffusion transfer and being so constructed as to be disposable after the plurality of pictures have been taken and processed to form positives, said device comprising, in combination, a housing, a lens and shutter assembly, a pressure-applying device through which an exposed photosensitive sheet and a second sheet are withdrawn from said housing in superposition for spreading a fluid processing agent in a layer therebetween, a plurality of photosensitive sheets arranged in stacked relation against one wall of said housing with one of said sheets in position for exposure, a plurality of second sheets arranged in stacked relation against another wall of said housing, means connecting said photosensitive sheets to one another and providing a leader attached to said one photosensitive sheet located in position for exposure and extending from said housing through said pressure-applying device, means connecting said second sheets with one another and providing a leader extending in superposition with the first-mentioned leader from said housing through said pressure-applying device, said housing being permanently assembled, formed entirely of a thin sheet material and comprising a first blank having generally rectangular sections providing a rear wall, upper wall and lower wall, two generally triangular sections providing side walls for said housing and flaps along an edge of at least three sides of said sections for securing said sections together to form said housing, a second blank comprising a first rectangular section providing a first inner wall mounted within said housing in a plane generally parallel with a plane of said rear wall and spaced from said rear wall for providing a chamber containing said photosensitive sheets, said first inner wall having a generally rectangular exposure aperture and being located with its rear surface substantially in the focal surface of said lens, a second rectangular section providing a second inner wall so located with respect to and spaced from said lower wall as to provide a second chamber containing said second sheets and a third generally rectangular section secured in superposition per unit surface of said upper wall, said second and third rectangular sections including a plurality of portions folded inwardly to provide baffles for restricting light reflection within the chamber defined by the last-mentioned sections and said side walls and said first inner wall.

20. A photographic device for exposing and processing a plurality of photosensitive sheets for producing a plurality of positive prints by diffusion transfer and being so constructed as to be disposable after the plurality of pictures have been taken and processed to form positives, said device comprising, in combination, a housing, a lens and shutter assembly, a pressure-applying device through which an exposed photosensitive sheet and second sheet are moved in superposition for spreading a fluid processing agent in a layer thereebtween, a plurality of photosensitive sheets arranged in stacked relation against one wall of said housing with one of said sheets in position for exposure, a plurality of second sheets arranged in stacked relation against another wall of said housing, means connecting said photosensitive sheets to one another and providing a leader attached to said one photosensitive sheet located in position for exposure and extending from said housing through said pressure-applying device, means connecting said second sheets with one another and providing a leader extending in superposition with the first-mentioned leader from said housing through said pressure-applying device, said housing being permanently assembled, formed entirely of a thin sheet material and comprising a first blank having generally rectangular sections providing a rear wall, upper wall and lower wall, two generally triangular sections providing side walls for said housing and flaps along an edge of at least three of said sections for securing said sections together to form said casing, and a second blank comprising a first rectangular section providing a first inner wall mounted within said housing in a plane generally parallel with a plane of said rear wall and spaced from said rear wall for providing a first chamber containing said first sheets, said first inner wall having a generally rectangular exposure aperture and being located with its rear surface substantially in the focal surface of said lens, and a second rectangular section providing a second inner wall so located with respect to and spaced from said lower wall as to provide a second chamber containing said second sheets, said second rectangular section including a portion adjacent the intersection of said inner wall and said first inner wall folded outwardly toward said lower wall to form a partial closure for said second chamber providing a narrow opening therein through which said second sheets and containers are movable, one at a time, from said second chamber.

References Cited in the file of this patent

UNITED STATES PATENTS

| 1,184,110 | Linder | May 23, 1916 |
| 2,435,720 | Land | Feb. 10, 1948 |